United States Patent
Xu (10) Patent No.: US 8,589,454 B2
(45) Date of Patent: Nov. 19, 2013

(54) COMPUTER DATA FILE MERGING BASED ON FILE METADATA

(75) Inventor: Tony Hui Xu, Sunnyvale, CA (US)

(73) Assignee: International Business Machines Corporation, Armonk, NY (US)

( * ) Notice: Subject to any disclaimer, the term of this patent is extended or adjusted under 35 U.S.C. 154(b) by 167 days.

(21) Appl. No.: 13/007,990

(22) Filed: Jan. 17, 2011

(65) Prior Publication Data

US 2012/0185516 A1    Jul. 19, 2012

(51) Int. Cl.
G06F 12/00    (2006.01)
G06F 17/30    (2006.01)
G06F 7/00    (2006.01)
G06F 17/00    (2006.01)

(52) U.S. Cl.
USPC .......................... 707/808; 707/616; 707/641

(58) Field of Classification Search
USPC .......................... 707/808, 616, 641, 999.001
See application file for complete search history.

(56) References Cited

U.S. PATENT DOCUMENTS

| 4,956,791 | A | * | 9/1990 | Lee et al. | 706/48 |
| 5,630,138 | A | * | 5/1997 | Raman | 717/162 |
| 7,337,297 | B2 | | 2/2008 | Chen et al. | |
| 2006/0026221 | A1 | * | 2/2006 | Chen et al. | 707/205 |
| 2009/0051698 | A1 | * | 2/2009 | Boose et al. | 345/619 |

* cited by examiner

*Primary Examiner* — Alexey Shmatov
(74) *Attorney, Agent, or Firm* — Rabindranath Dutta; Konrad, Raynes, Davda and Victor LLP (57) ABSTRACT

Embodiments of the disclosure relate to file merging based on file metadata. An exemplary embodiment concerns a system for merging two files that may comprise first and second data structures respectively associated with first and first files. Each data structure may include a starting address and an ending address of the associated file, and file attributes. The system may include a logic component for respectively referencing the starting address and ending address of a second file in the starting address and ending address of a first file, and a logic component for linking the last record in the first file with the first record of in the second file.

18 Claims, 6 Drawing Sheets

COMPUTER DATA FILE MERGING BASED ON FILE METADATA

BACKGROUND

Embodiments of the disclosure relate generally to information processing, and more particularly, to the merging of data files in a computer system.

In the field of information technology, a the or data set is a collection of logically related data and can be a source program, a library of macros, or a file of data records used by a processing program. Data records are the basic unit of information used by a processing program. Data in a file may be processed and saved into the same the or a different file. A file may be stored on a secondary storage device, such as a DASD volume or a magnetic tape volume, and its contents may be printed to a printer or displayed on a terminal. Data in a file may be maintained in the form of records where each record may be of, for example, 80 bytes in length.

In processing data files, an application program or a file processing program may need to combine or merge multiple files into a single file. In current practice, a program may need to first open the files from which data is to be merged, using a data access method such as VSAM. Assuming that the program is merging data from a first file into a second file, the program may perform a GET operation for each data record in the first file to obtain the data record, and then perform a PUT operation to add the data record being processed to the end of the second file. The program would repeat the GET and PUT operations for each record in the first file until it reaches an end-of-file marker in the first file. Such a process would be very time-consuming, in particular for large files with millions of data records.

Further, current file merging approaches may include a caching of the merged data, which may require setting up data structures in an internal system storage and some types of locking to serialize the files being merged. These tasks all add to the overall processing time that a program would need in order to complete the merging of the files.

There is thus a need for a more efficient method and system for merging files or data sets.

BRIEF SUMMARY OF THE DISCLOSURE

Exemplary embodiments of the disclosure relate to data handling applications or system programs that merge two or more files (or data sets) into a single file using file metadata. Each file typically includes data records of fixed or variable length size. One aspect of the disclosure concerns a system for merging first and second files that may comprise data structures respectively associated with the first and second files. Each data structure may include a starting address and an ending address of the respectively associated file. The system may further comprise a logic component for respectively referencing the starting address and ending address of the second file in the starting address and ending address of a first file, and a logic component for linking the last record of the first file with the first record of the second file.

Another aspect of the disclosure concerns a computer implemented method for merging files each including multiple data records. The method may comprise providing first and second data structures respectively associated with first and second files to be merged. Each of the first and second data structures may include the starting address and ending address of the respectively associated file. The method may further comprise respectively referencing the starting address and ending address of the second file in the starting address and ending address of the first file, and linking the last record of the first file with the first record of the second file.

Still another aspect of the disclosure concerns a computer program product for merging files each including multiple data records. The computer program product comprises a computer readable storage medium having computer readable program code embodied therewith and configured to provide first and second data structures respectively associated with first and second files to be merged. Each of the first and second data structures may include the starting address and ending address of the respectively associated file. The computer program product may further comprise computer readable program code configured to respectively reference the starting address and ending address of the second file in the starting address and ending address of the first file, and link the last record of the first file with the first record of the second file.

The details of the exemplary embodiments of the invention, both as to their structure and operation, are described below in the Detailed Description section in reference to the accompanying drawings, in which like reference numerals refer to like parts. The Brief Summary section is intended to identify key features of the claimed subject matter, but it is not intended to be used to limit the scope of the claimed subject matter.

DETAILED DESCRIPTION OF THE DISCLOSURE

Exemplary embodiments of the invention provide a system, computer implemented method, and computer program product for merging files or data sets in a computer system based on file metadata. The embodiments of the invention may be applicable to, for example, data handling programs, database applications, and system utilities for accessing and managing computer data. The embodiments may also be applicable to computer emulators that allow software applications designed for one system environment, e.g., IBM z/OS™, to run on other types of computer hardware and software. The embodiments of the invention may be provided as a function in a user application for manipulating data or a system application for accessing a system's database. In accordance with an embodiment of the invention, a user or a system program may initiate an operation to merge two or more files into a single file. Responsive to the merge command initiated by the user or the system program, embodiments of the invention may accomplish the file merge by updating a data structure that contains file metadata of a first file with file metadata of a second file. The embodiments of the invention may further link the last record of the first file to the beginning record of the second file.

Figure 1:
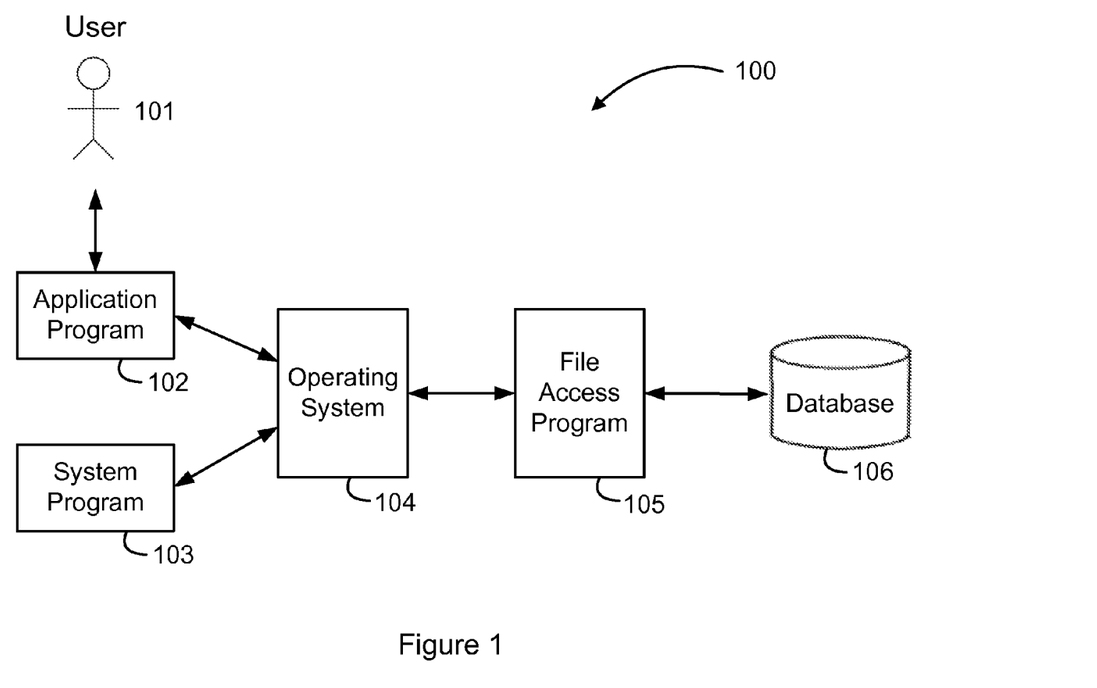
FIG. 1 illustrates a block diagram of an exemplary data processing environment in which aspects of the disclosure may be implemented.

Referring to FIG. 1, there is illustrated a block diagram of a data processing environment 100 in which a file merging utility may be implemented in accordance with aspects of the invention. The data processing environment 100 may provide a user application program 102, such as a database application, through which a user 101 may combine two or more files into one file. The processing environment 100 may further provide a system program 103, such as a data access system utility, that includes the capability to merge two or more files. User application program 102 and system program 103 generally interface with a file access program 105 through an operating system 104. For example, operating system 104 may be an IBM z/OS™ operating system or a Microsoft Windows™ operating system. In current computer system programs, the file access program 105 is generally referred to as an access method service. Examples of access method services include VSAM (Virtual Storage Access Method), VSAM-RLS (Virtual Storage Access Method Record Level Sharing), BPAM (Basic Partition Access Method), and BSAM (Basic Sequential Access Method). The data processing environment 100 typically maintains files and data sets in a database 106. The user application 102 and system program 103 thus may access the data files in the database 106 through the file access program 105 and under the control of the operating system 105.

As an example, the file merging function in accordance with embodiments of the invention may be provided by the file access program 105, but is not limited to such a program or the like. Alternatively, the file merging function may be implemented in another component in the data processing environment 100. Once a file merging operation is completed, the resulting merged file may be presented to the user 101 through user application 102 or returned to the system program 103. The resulting merged file may be returned to the user 101 through a computer user interface as commonly known in the computer field.

Figure 2:
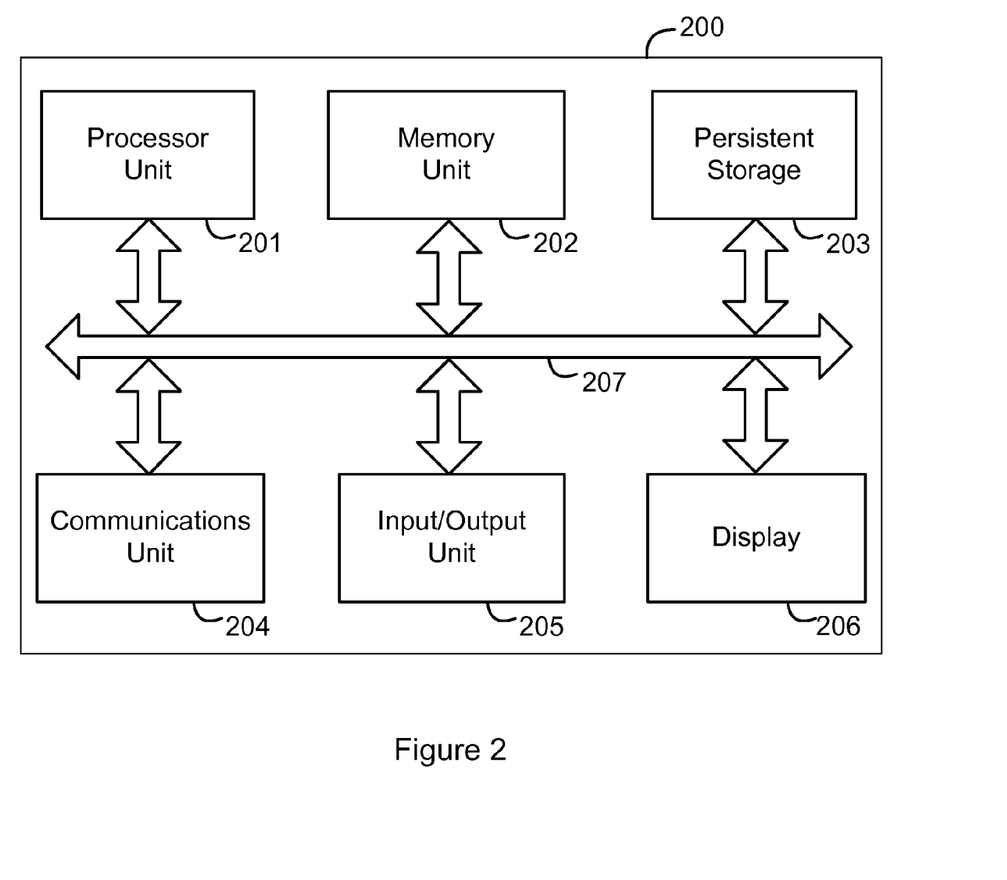
FIG. 2 illustrates a block diagram of a representative computer system that may be used for providing a file merging function in accordance with the exemplary embodiments of the disclosure.

FIG. 2 illustrates a block diagram of a representative computer system in which a file processing program may operate to merge files, according to an exemplary embodiment of the invention. Data processing system 200 typically includes a processor unit 201, a memory unit 202, a persistent storage 203, a communications unit 204, an input/output unit 205, a display 206, and system bus 207. The processor unit 201, such as IBM Power7™ processor, is capable of executing computer program instructions, controlling and communicating with various internal and external components that are connected to the computer system, such as memory unit 202 and input/output unit 205. The processor unit 201 may comprise various support circuits to enable communication between itself and other components of the system 200. Communication among the various components of the system 200 may take place over system bus 207.

Memory unit 202 may comprise a combination of random access memory (RAM), read only memory (ROM), and the like for storing program instructions to be executed, system registers, temporary data, etc. Persistent storage 203 may include hard disks, CD-ROMs, flash memory, and the like for storing data. Input/output unit 201 may include a keyboard, mouse, scanner, printer, and the like. Computer programs are typically stored in persistent storage 203 until they are needed for execution, at which time the programs are brought into memory unit 202 so that they can be directly accessed by processor unit 201. Processor 201 may select a part of memory unit 202 to read from or write to the memory unit 202. Usually, the reading and interpretation of an encoded instruction at a memory address causes processor 201 to fetch a subsequent instruction, either at a subsequent address or some other address in memory unit 202.

In an embodiment of the invention, the computer system 200 may execute a user application 102 or system program 103 that provides a file merging capability in accordance with aspects of the invention, as described below.

Figure 3:
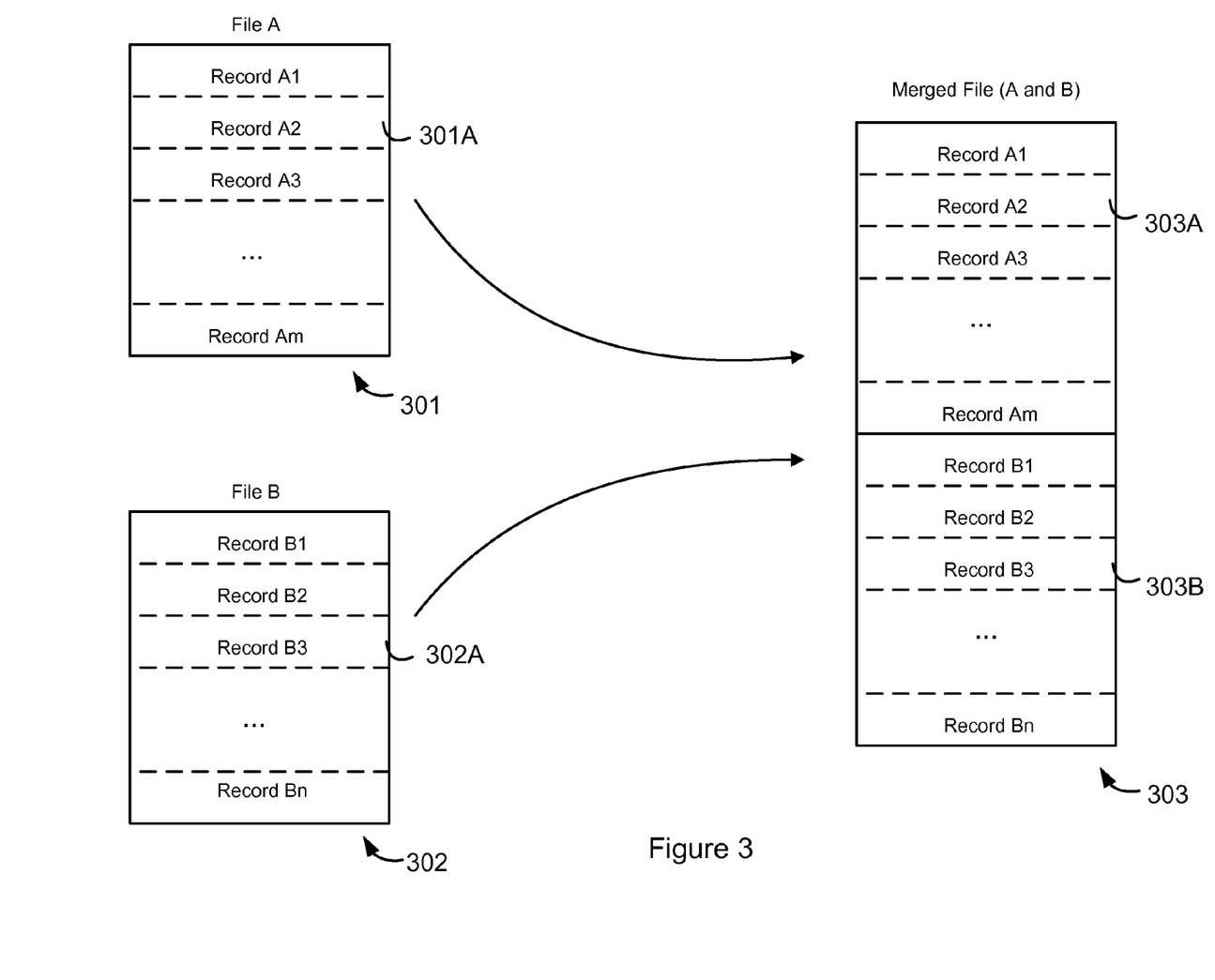
FIG. 3 schematically illustrates an operation for merging two files according to an exemplary embodiment of the disclosure.

FIG. 3 illustrates an example in which a file B (302) is merged into a file A (301), in accordance with an embodiment of the invention. The file A (301) may contain multiple data records 301A, such as records A1, A2, A3 . . . , and Am. The file B (302) may contain multiple data records 302A, such as records B1, B2, B3 . . . , and Bn. The resulting file A, after file B has been merged into file A, is illustrated as file 303, which includes data records A1, A2, . . . , Am (records 303A) from the original file A (301) and data records B1, B2, . . . , Bn (records 303B) from the original file B. As an example, the merged file 303 is illustrated as a sequential file where the data records B1, B2, . . . , Bn (303B) of the original file B are concatenated to the end of the data records A1, A2, . . . , Am (303A) of the original file A (301). In another embodiment of the invention, the files A and B to be merged may be indexed files wherein the data records 303B of indexed file B may be merged with the data records 303A of indexed file B based on their respective file indexes.

An indexed file is a computer data file that allows random access to any record in the file based on a key that uniquely identifies the record. The unique keys for the records in the indexed file are typically maintained in an index structure of the file. An index structure is any data structure which improves the performance of identifying records in a file. Different types of data structures may be used as file indexes, such as arrays of multiple dimensions.

Figure 4:
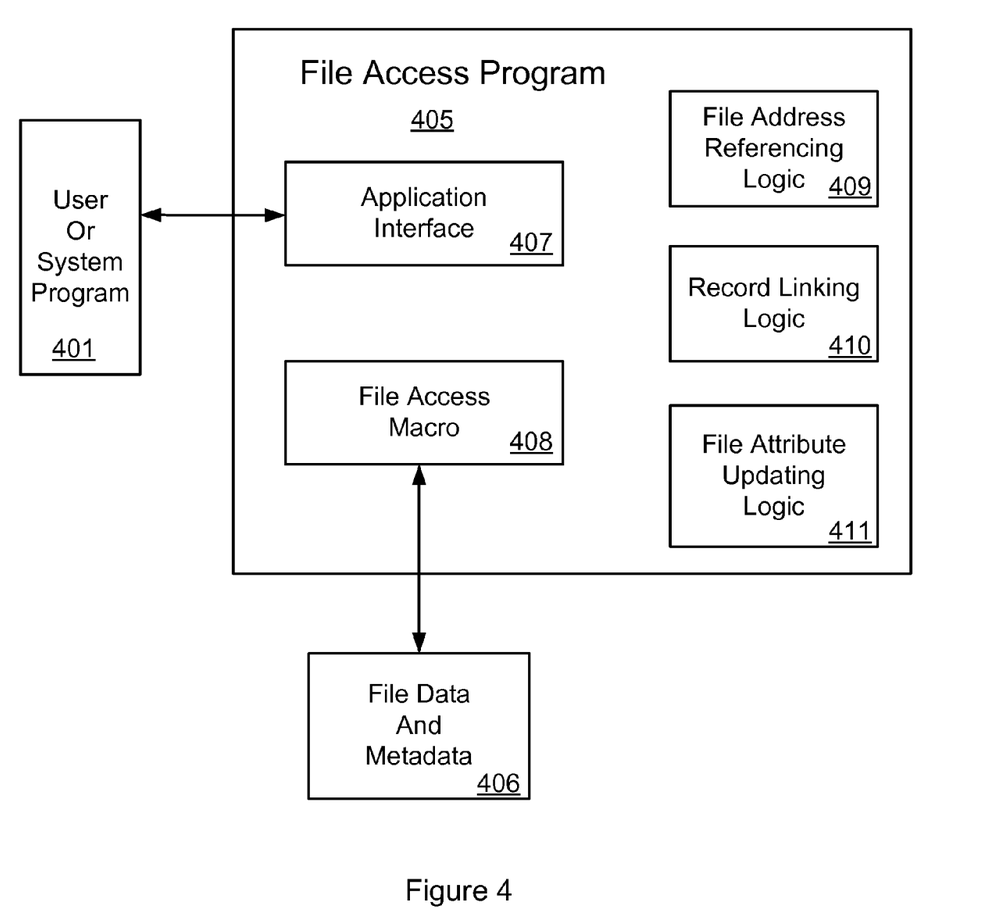
FIG. 4 illustrates an embodiment of a file access program for merging files, according to an exemplary embodiment of the disclosure.

Referring now to FIG. 4, there is illustrated an exemplary embodiment of file access program 405 for merging files. The file access program 405 may comprise an application interface 407 for communication with a user file manipulation program or a system data handling program 401. File access macro 408 may be a component through which the file access program 405 may access the files to be merged, such as opening the files, reading from the files, and writing to the files or file metadata structures 406. The file access program 405 may include a file address referencing logic component 409 for referencing the starting address and ending address of one of the merged files in the destination file, i.e., the resulting file formed by the merging of the other files.

The file access program 405 may further include a record linking logic component 410 for associating the beginning record of one of the merged files with the last record in the destination file. The file access program 405 may also comprise an attribute updating component 411 for updating the file attributes of the destination file as a result of the merge operation. The file attributes may be part of the file metadata structure associated with the destination file and may include the number of data tracks and data extents allocated to the destination file, file access mode, access authorization, and version number of the destination file.

Figure 5:
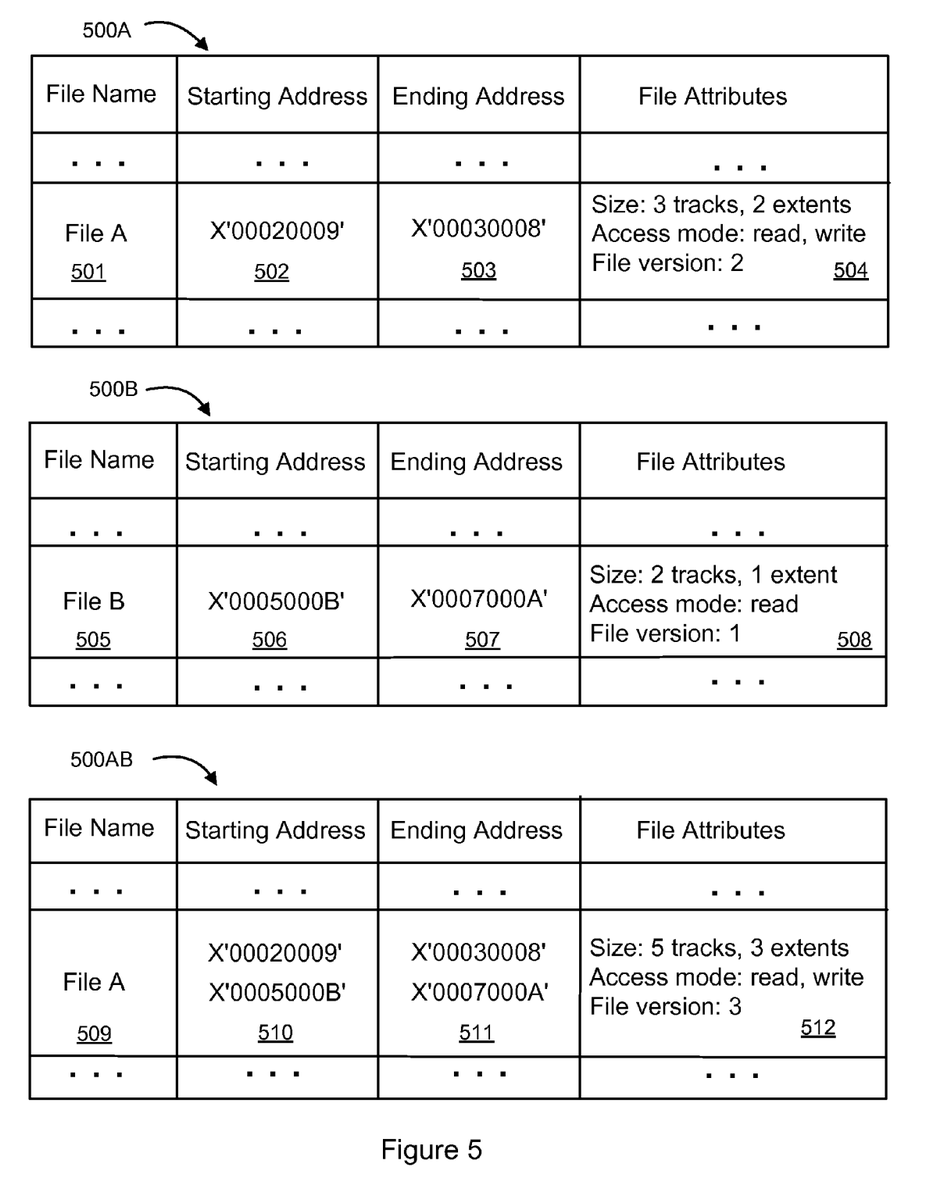
FIG. 5 illustrates exemplary data structures that include file metadata associated with two files being merged and the resulting merged file, according to an embodiment of the disclosure.

FIG. 5 illustrates exemplary data structures that include file metadata of two files to be merged and file metadata of the destination file, according to an embodiment of the disclosure. Data structure 500A contains metadata for a file A which includes a file name 501 having the value of "File A", a starting address 502 having the value of X'00020009', and an ending address having the value of X'00030008'. The starting address X'00020009' may represent the address at which the first data record of file A is currently in persistent storage, such as a disk drive, flash drive, etc. Similarly, the ending address X'00030008' may represent the address at which the last data record of file A is currently in persistent storage. File metadata structure 500A may further include attributes 504 relating to file A such as the number of data tracks and data extents that a storage system has allocated to file A, its current access mode (e.g., read only, or both read and write), access authorization, and version number of file A.

The file metadata structure 500B includes similar information for file B, such a file name 505 having the value of "File B", a starting address 506 of the value X'0005000B', an ending address 507 of the value X'0007000A', and file attributes 508. In an embodiment of the invention, file B may be merged into file A by a file access program 405 when the file access program 405 updates the contents of the metadata structure 500A associated with file A to incorporate the contents of the metadata structure 500B. An exemplary updated metadata file structure for file A is illustrated as structure 500AB in FIG. 5. Since file B was merged into file A, the file name 509 may remain as "File A" in the illustrated embodiment.

The update by the file access program 405 may include respectively referencing the starting address and ending address of file B (506, 507) in the starting address and ending address of the resulting file A (510, 511). In addition, the address referencing may include revising file attributes 512 of the resulting file A to reflect the new file information for file A, such as the new number of data tracks, number of data extents, access authorization, and a new file version associated with the resulting file A. The values of file attributes 512 for the resulting file A may have changed as a result of the inclusion of data from file B into file A as data from file B is now incorporated into file A. For example, the number of data tracks and data extents allocated to file A may now become 5 tracks and 3 extents, respectively, instead of the previous 3 tracks and 2 extents. The version number for file A may become version 3 rather than the previous version 2, as illustrated.

In another embodiment of the invention, the file metadata updating may include changing the value of the ending address 503 of the file A from X'00030008' to the value of the ending address for file B, which is X'0007000A'. The starting address 510 of the resulting merged file A was not updated in the merge operation and still has the value of X'00020009', which points to the location of the first data record in file A. The ending address of the resulting file A now has the value of X'0007000A', which was the ending address of file B and corresponds to the location of the last record of file B in system storage.

Figure 6:
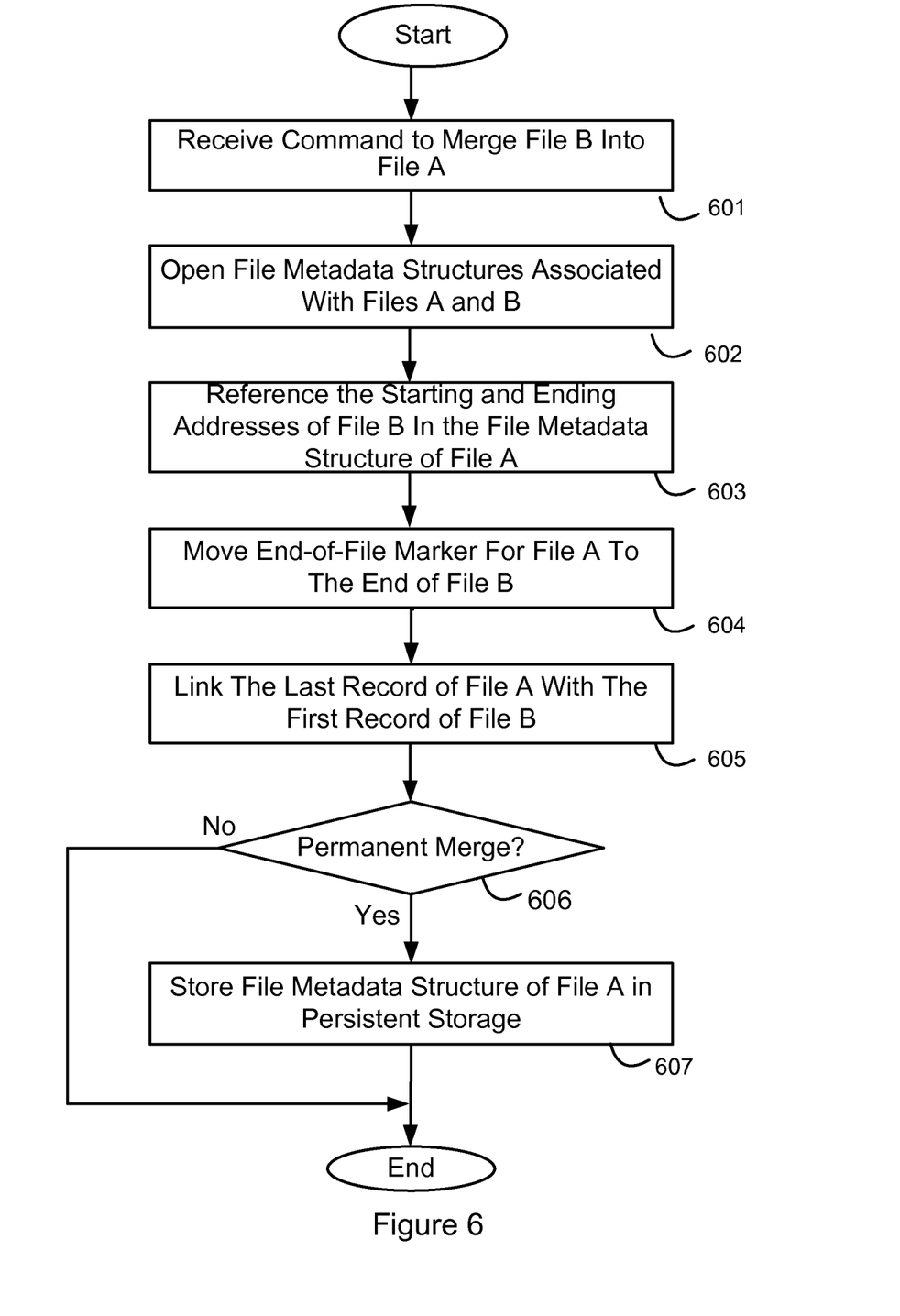
FIG. 6 illustrates a flowchart of an exemplary process for merging files in accordance with an embodiment of the disclosure.

FIG. 6 illustrates a flowchart of an exemplary process for merging files in accordance with an embodiment of the disclosure. As an example, during a file editing session, a user may need to combine two files A and B into a single file. In order to combine the two files, the user may initiate a command from a file processing application to merge the content of file B into the content of file A. In another file merge scenario, a file processing application, such as a database application, may issue a command to a file access utility to merge the contents of files A and B into a single file. The processing of the merge command, whether the merge operation is initiated by a user while the user is editing the files or by a data processing application, may begin at step 601 in FIG. 5. At step 602, a file access utility program may open the data structures that contain file metadata for files A and B. The file metadata may include information such as the starting addresses of the files, the ending addresses of the files, and other file attributes.

As part of the file merge operation, the file access utility may reference the starting and ending addresses of file B in the file metadata structure associated with file A, at step 603. This address referencing may in effect cause an end-of-file marker in file A to now point to the end of file B. Alternatively, the file access utility may move the end-of-file marker for file A to the end of file B, or update the end-of-file marker for file A to now point to the end of file B, per step 604. The file access utility may further link the last data record in file A with the first data record in file B, at step 605. The record linking may be accomplished by updating a reference in the last data record of file A with a pointer to the first data record in file B. At step 606, the file access utility may determine whether the file merge being processed is a temporary merge or a permanent merge. If the user or data handling application is performing a permanent merge operation, then the file access utility may store the updated file metadata structure for file A in persistent storage, per step 607. Otherwise, the file access utility may conclude that the file merge is a temporary operation and leave the updated metadata file structure for file A in temporary storage, which may later be written over with other data in a subsequent operation.

The subject matter described above is provided by way of illustration only and should not be construed as limiting. Various modifications and substitutions of the described components and operations can be made by those skilled in the art without departing from the spirit and scope of the disclosure defined in the following claims, the scope of which is to be accorded the broadest interpretation so as to encompass such modifications and equivalent structures. As will be appreciated by those skilled in the art, the systems, methods, and procedures described herein can be embodied in a programmable computer, computer executable software, or digital circuitry. The software can be stored on computer readable media. For example, computer readable media can include a floppy disk, RAM, ROM, hard disk, removable media, flash memory, a "memory stick", optical media, magneto-optical media, CD-ROM, etc.

Accordingly, aspects of the disclosure may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures described above illustrate the architecture, functionality, and operation of possible implementations of systems, methods and computer program products according to various embodiments of the disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A system for merging files, wherein each file includes a plurality of data records, the system comprising:
a processor of the system communicating with a memory, wherein the memory includes:
a first data structure associated with a first file and including a starting address and an ending address of a first file;
a second data structure associated with a second file to be merged into the first file, the second data structure including a starting address and an ending address of a second file;
the system further including a referencing logic component for respectively referencing the starting address and the ending address of the second file in the starting address and ending address of the first file, wherein a linking logic component links a last record of the first file with the first record of the second file; and
determining whether a file merger is a temporary merge or a permanent merge, wherein in response to determining that the file merger is the permanent merge an update to the first data structure is stored in persistent storage, and in response to determining that the file merger is the temporary merge the update to the first data structure is stored in a temporary storage, and wherein the temporary storage is subsequently overwritten with other data records.

2. The system of claim 1, wherein a resulting merged file is displayed to a user.

3. The system of claim 2, wherein the first file and the second file allow random access to each of the plurality of data records in the first file and the second file based on keys that uniquely identify each of the plurality of data records, wherein arrays of a plurality of dimensions are used as file indexes for allowing the random access.

4. The system of claim 3, wherein a database application issues a command to a file access utility to merge contents of the first file and the second file into a single file.

5. The system of claim 4, wherein the first and the second data structures comprise file attributes.

6. The system of claim 5, wherein the file attributes comprise at least one of a number of allocated data tracks, a number of allocated data extents, an access mode, an access authorization, and a file version number of a file.

7. A computer implemented method for merging files, wherein each file includes a plurality of data records, the computer implemented method comprising:

providing a first data structure associated with a first file and including a starting address and an ending address of a first file;

providing a second data structure associated with a second file to be merged into the first file, the second data structure including a starting address and an ending address of a second file;

referencing, respectively, the starting address and the ending address of the second file in the starting address and ending address of the first file, wherein a linking logic component links a last record of the first file with the first record of the second file; and determining whether a file merger is a temporary merge or a permanent merge, wherein in response to determining that the file merger is the permanent merge an update to the first data structure is stored in persistent storage, and in response to determining that the file merger is the temporary merge the update to the first data structure is stored in a temporary storage, and wherein the temporary storage is subsequently overwritten with other data records.

8. The computer implemented method of claim 7, wherein a resulting merged file is displayed to a user.

9. The computer implemented method of claim 8, wherein the first file and the second file allow random access to each of the plurality of data records in the first file and the second file based on keys that uniquely identify each of the plurality of data records, wherein arrays of a plurality of dimensions are used as file indexes for allowing the random access.

10. The computer implemented method of claim 9, wherein a database application issues a command to a file access utility to merge contents of the first file and the second file into a single file.

11. The computer implemented method of claim 10, wherein the first and the second data structures comprise file attributes.

12. The computer implemented method of claim 11, wherein the file attributes comprise at least one of a number of allocated data tracks, a number of allocated data extents, an access mode, an access authorization, and a file version number of a file.

13. A computer program product for merging files, wherein each file includes a plurality of data records, the computer program product comprising a non-transitory computer readable storage medium having computer readable program code embodied therewith, wherein the computer readable program code when executed by a processor causes operations to be performed, the operations comprising:

providing a first data structure associated with a first file and including a starting address and an ending address of a first file;

providing a second data structure associated with a second file to be merged into the first file, the second data structure including a starting address and an ending address of a second file;

referencing, respectively, the starting address and the ending address of the second file in the starting address and ending address of the first file, wherein a linking logic component links a last record of the first file with the first record of the second file; and determining whether a file merger is a temporary merge or a permanent merge, wherein in response to determining that the file merger is the permanent merge an update to the first data structure is stored in persistent storage, and in response to determining that the file merger is the temporary merge the update to the first data structure is stored in a temporary storage, and wherein the temporary storage is subsequently overwritten with other data records.

14. The computer program product of claim 13, wherein a resulting merged file is displayed to a user.

15. The computer program product of claim 14, wherein the first file and the second file allow random access to each of the plurality of data records in the first file and the second file based on keys that uniquely identify each of the plurality of data records, wherein arrays of a plurality of dimensions are used as file indexes for allowing the random access.

16. The computer program product of claim 15, wherein a database application issues a command to a file access utility to merge contents of the first file and the second file into a single file.

17. The computer program product of claim 16, wherein the first and the second data structures comprise file attributes.

18. The computer program product of claim 17, wherein the file attributes comprise at least one of a number of allocated data tracks, a number of allocated data extents, an access mode, an access authorization, and a file version number of a file.

* * * * *